United States Patent
Lawson et al.

(10) Patent No.: US 11,714,097 B2
(45) Date of Patent: Aug. 1, 2023

(54) ALIGNING DATA OF CONTINUOUS MATERIAL FLOW IN DIGITAL MANUFACTURING TRANSFORMATION

(71) Applicant: ThinkIQ, Inc., Aliso Viejo, CA (US)

(72) Inventors: Douglas C. Lawson, Silverado, CA (US); Niels Andersen, Dana Point, CA (US)

(73) Assignee: THINKIQ, INC., Aliso Viejo, CA (US)

( * ) Notice: Subject to any disclaimer, the term of this patent is extended or adjusted under 35 U.S.C. 154(b) by 0 days.

(21) Appl. No.: 17/709,137

(22) Filed: Mar. 30, 2022

(65) Prior Publication Data

US 2022/0326272 A1 Oct. 13, 2022

Related U.S. Application Data

(60) Provisional application No. 63/173,159, filed on Apr. 9, 2021.

(51) Int. Cl.
*G01P 3/00* (2006.01)
*B65G 15/28* (2006.01)

(52) U.S. Cl.
CPC .............. *G01P 3/00* (2013.01); *B65G 15/28* (2013.01); *B65G 2203/025* (2013.01)

(58) Field of Classification Search
CPC ..... G01P 3/00; B65G 15/28; B65G 2203/025; G05B 19/0426; G05B 19/4185; G05B 2219/31466
See application file for complete search history.

(56) References Cited

U.S. PATENT DOCUMENTS

| | | |
|---|---|---|
| 2003/0024305 A1 | 2/2003 | Ireland et al. |
| 2010/0023151 A1* | 1/2010 | Shieh ............... G05B 19/41885 700/121 |
| 2017/0103137 A1 | 4/2017 | Lawson et al. |
| 2022/0137606 A1* | 5/2022 | Chathuruthy ...... G05B 23/0294 700/108 |

OTHER PUBLICATIONS

International Search Report and Written Opinion, Patent Cooperation Treaty Application No. PCT/US2022/022629, dated Jul. 7, 2022, 13 pages.

* cited by examiner

*Primary Examiner* — Manuel L Barbee
(74) *Attorney, Agent, or Firm* — Fenwick & West LLP

(57) ABSTRACT

A system and a method are disclosed for aligning process data to a flow of material in a manufacturing process. That is, the disclosed embodiments enable tracking of material as that material travels (e.g., via a transportation mechanism such as a conveyor belt) between various processing devices in the manufacturing process. Each processing device may include one or more sensors. For example, the disclosed system and method enable tracking the same material over different manufacturing steps.

20 Claims, 11 Drawing Sheets

700

702 — Continually detect, using one or more sensors at a first position, one or more first attributes associated with the material

704 — Continually detect, using one or more sensors at a second position, one or more second attributes associated with the material, where the material is transported using a transportation mechanism from the first position to the second position

706 — Periodically store, in a first record, the one or more first attributes with a corresponding first time of detection and in a second record the one or more second attributes with a corresponding second time of detection

708 — Determine, using one or more speed sensors, a speed of the material as it is transported using the transportation mechanism, wherein the speed of the material changes while the material is transported from the first position to the second position

710 — Periodically store the speed of the material with a corresponding time of detection

712 — Based on stored speeds, a distance between the first position and the second position, calculate, for each first record, an offset time when a portion of the material corresponding to the first attributes in the first record passes the second position

714 — Based on a corresponding offset time, align each first record with a corresponding second record

*FIG. 7*

ALIGNING DATA OF CONTINUOUS MATERIAL FLOW IN DIGITAL MANUFACTURING TRANSFORMATION

CROSS REFERENCE TO RELATED APPLICATIONS

The present application claims the benefit of U.S. Provisional Application 63/173,159 filed on Apr. 9, 2021, which is incorporated by reference in its entirety.

TECHNICAL FIELD

The disclosure generally relates to the field of material transport and material flow analysis.

BACKGROUND

Various systems exist in the market today that enable tracking parts throughout an assembly line. For example, when a car part is being built, it can be tracked using, for example, a serial number. However, it is difficult to track a process that turns a material into a product. For example, it is difficult to track the process of turning potatoes into fries because the raw materials (potatoes) get turned into intermediate materials as those materials travel between various devices that process the potatoes as the potatoes and the fries do not have serial numbers on them. There are many reasons that tracking materials may be required. For example, if the final product is not of a proper quality or quantity, tracking materials may allow a manufacturer to track down where the issue lies and fix that issue. In addition, such tracking may be useful to understand why a particular quantity or quality of a final product is created based on particular raw materials.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a data alignment system that aligns material detection between two positions.

FIG. 7 illustrates a method for aligning process data to a flow of material in a manufacturing process.

DETAILED DESCRIPTION

Figure 1:
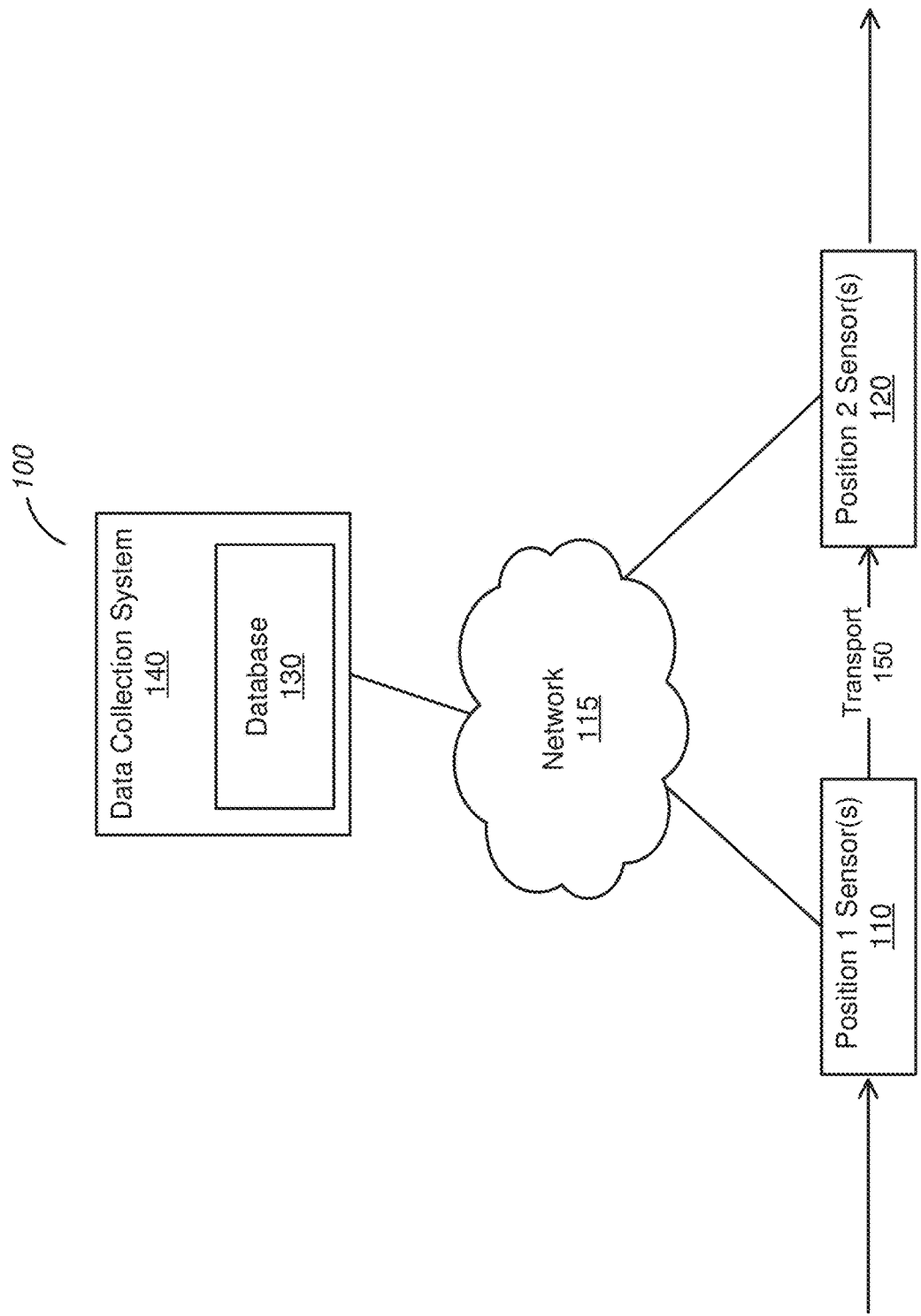

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Material Tracking

One embodiment of a disclosed system, method and computer readable storage medium that includes aligning process data to a flow of material in a manufacturing process. That is, the disclosed embodiments enable tracking of material as that material travels (e.g., via a transportation mechanism such as a conveyor) between various processing devices in the manufacturing process. Each processing device may include one or more sensors. For example, a processing device may include one or more sensors that detect the conditions of the process or the material such as temperature sensors, image sensors, pressure sensors, acidity sensors, gravity sensors, flow sensors, mass sensors, level sensors, color sensor, metal sensor, x-ray sensors, weight sensors, pressure sensors, proximity sensors, and any other sensor. At each processing device within the manufacturing process, one or more sensors may continually detect attributes of the material and/or output of the process. Some attributes may include, dimensions of the material, temperature or material of the processing device, color of the material, density of the material, flow amount, stored content volume, stored content mass, foreign materials, etc.

The detected attributes may be periodically stored in a corresponding record with a corresponding time of detection. The data may be transmitted to a database. In addition, each transportation mechanism (e.g., conveyor) may be coupled with a speed sensor for determining speed of the material as that material is transported from one processing device to another. It should be noted that various factors may affect the speed of the transportation mechanism, thus the speed may not be constant, but changes periodically. The speed of the material may be stored with a corresponding time of detection. Based on stored speeds and a distance between, for example, two positions, an offset time may be calculated when the same material is detected at one of the positions and later in the process at another position. The positions may or may not be consecutive positions. Based on a corresponding offset time, an alignment is generated for when particular material or output of the particular material is detected at different positions (e.g., different processing devices) in the manufacturing process.

FIG. 1 illustrates an example of a data alignment system 100 that aligns material detection between two positions. Data alignment system 100 includes a data collection system 140 and a database 130. Database 130 may be hosted on the same equipment as the data collection system 140 or on different computer equipment. Data collection system 140 is connected with position 1 sensor(s) 110 and position 2 sensor(s) 120 through network 115. Network 115 may be any network (e.g., an Internet, Intranet, or combination of both). FIG. 1 also illustrates a transport mechanism 150 that moves material from position 1 to position 2. Position 1 sensor(s) 110 continually (e.g., every second, every 10 seconds, every 30 seconds, or another suitable interval) detect one or more attributes associated with the material as that material travels through position 1. Some attributes may include dimensions of the material, temperature or material of the processing device, color of the material, density of the material, flow amount, stored content volume, stored content mass, foreign materials, etc. In addition, position 2 sensor(s) 120 continually (e.g., every second, every 10 seconds, every 30 seconds, or another suitable variable or fixed interval) detect one or more attributes associated with the material as that material travels through position 2. Those sensors send the detected attributes to data collection system 140. Data collection system 140 periodically stores in a record (e.g., in database 130) the one or more attributes detected at position 1 with a corresponding time of detection and in another record the one or more attributes detected at position 2 with a corresponding time of detection. For example, each record may be stored in a database table and/or each record may be a database table.

Transport 150 may include one or more sensors that are able to measure speed of material as it moves from position 1 to position 2. The one or more sensors may transmit the speed data to data collection system 140. Data collection system 140 may determine the speed of the material as it is transported. As the material is transported, its speed may change based on a variety of factors, such as material starvation or blockage from upstream and downstream equipment, recipe set point for processing times (e.g. a slower transportation speed in an oven will cause the baking time to be extended), fragility of the materials processed (a fragile material may require a lower speed as it could break at higher speed), and equipment processing capacity (e.g. a large vegetable takes longer to cook than a small vegetable). Data collection system 140 may periodically store the speed of the material with a corresponding time of detection. Based on the stored speeds and a distance between the first position and the second position, data collection system 140 may calculate, for each record of attributes detected at position 1, an offset time when a portion of the material corresponding to those attributes passes through position 2. When the offset is calculated, data collection system 140 may, based on a corresponding offset time, align each record corresponding to position 1 with a corresponding record representing the same material at position 2. For example, data collection system 140 may add an offset time to a record at position 1 corresponding to the record of position 2. In some embodiments, data collection system 140 may add a record identifier to the record associated with position 1 of a record associated with position 2.

In some embodiments, data collection system 140 may align records associated with position 1 and position 2. That is, data collection system 140 may, add an offset to both the record associated with position 1 and the record associated with position 2. For example, data collection system 140 may determine the offset as described above and add the offset to the record associated with position 1. Data collection system 140 may add the offset to the time when the data was collected at position 1 and come up with a time at position 2. Data collection system 140 may search for a record generated at position 2 at the calculated time and add to that record a reverse offset (e.g., negative offset) to the record associated with position 1. In some embodiments, data collection system 140 may add an identifier of the corresponding record.

In some embodiments, when the records are received, data collection system 140 may organize the records in a timeseries data store. That is the records may be stored sequentially organized by time using a storage method that can represent continuous data (different from transactional data) such as a temperature or a speed. The stored data includes a reference to the identifier for the sensor or calculated value (often referred to as a tag or attribute) and may include information about the status of the stored data (such as data quality). Additional metadata may be stored with reference to each tag/attribute identifier such as its interpolation method (how to determine values between the stored records) and unit of measure. In particular, when dealing with continuous data (unlike transactional data), there is more information between the records than at the records (similar to the fact that there are an infinite number of values between any two real numbers). In order to determine what the values are between the two records (real numbers), the data collection system 140 uses and stores metadata about an interpolation method. The most common interpolation methods are 'linear' (draw a straight line between the real values), 'previous' (stairstep, use the previous real value), 'next' (stairstep, use the next real value), and 'none' (there are no values between the two real values.

In some embodiments, the attribute data may be received with a high frequency (e.g., every second or even ten seconds). That may cause a very large dataset. However, much of the data in the dataset may be the same because the attributes may not change over a long period of time. For example, a temperature sensor may record the same temperature over a six-hour period every second. Therefore, to save on space and on processing, data collection system 140 may store a record for an attribute when that attribute changes. That is, data collection system 140 may store the one or more first attributes when one or more values of the one or more attributes change, and not when each value of the one or more attributes does not change. For example, there may be only one sensor at position 1 that transmits temperature data to data collection system 140 every second. While the temperature remains the same, data collection system 140 may not generate a new record. However, when data collection system 140 determines that the temperature changed, data collection system 140 may generate a new record. Alternatively, the data collection system 140 may record a range of timestamps corresponding to a value of an attribute until the value changes, such that the stored value is only stored once with the range of time that the value corresponds to.

In some embodiments, data collection system 140 may receive quality information together with attributes. The quality information may indicate how reliable the corresponding attribute or attributes are. Examples of conditions that may cause a non-good status to be recorded are faulty sensors or a communication error at the sensors indicating that a sensor signal is out of range.

Figure 2:
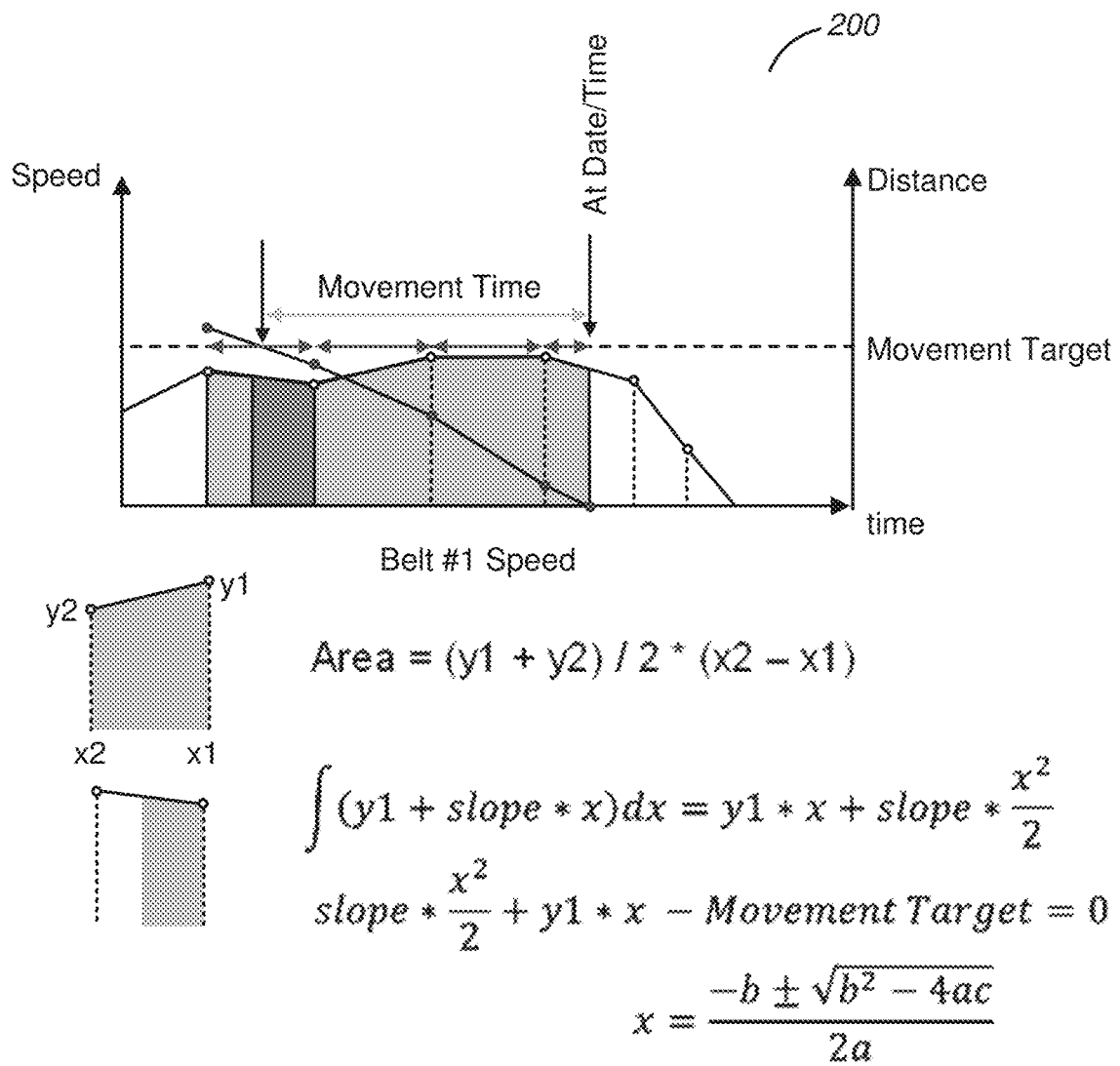
FIG. 2 illustrates a graph of a conveyor belt speed versus distance while that conveyor speed changes.

In some embodiments, data collection system 140 may calculate the offset time by calculating an integral of recorded speeds over time that it takes for a given portion of the material to travel between the first position and the second position. FIG. 2 illustrates the calculation. FIG. 2 illustrates a graph 200 of a conveyor belt speed versus distance while that conveyor speed changes. The calculation may be started with the speed trend which is measured over time (e.g., speed sensor data received over time). Based on that information, data collection system 140 may calculate an integrated speed which corresponds to a target moving distance. Data collection system 140 may select a point in time to calculate movement (calculate an integral) to that point and check whether the movement target has been reached. Data collection system 140 may continue calculating the calculations to each point until the target value is passed. The exact value may be calculated by integrating the selected period using the trapezoidal rule for numerically summing up the area under the graph. The interpretation of the values in the segments between the recorded points is determined by its interpolation method of the associated tag or attribute; a 'linear' interpolation will treat the line between the points as a straight line which requires the trapezoidal rule whereas 'previous' or 'next' interpolation methods will treat the data values as stair steps. The data collection system 140 sums up the areas for the collection of segments until the next record goes beyond the target travelled distance. The data collection system 140 uses the segment between the previous and next record to calculate the exact point in time for when the travelled distance was reached using the interpolation method. Using a 'linear' interpolation method means that the data collection system 140 would solve a second-degree polynomial function whereas using a 'previous' or 'next' method means that the data collection system 140 solves using a first-degree polynomial function. Once the time for all segments is known then the data collection system 140 can sum these segments to determine the transportation (or material flow) time.

In some embodiments, data collection system 140 may receive attribute data indicating a particular condition. For example, the condition in manufacturing fries may be a length of the fries which is not in line with the quality requirements. In this instance, data collection system 140 may correlate the time of the condition (e.g., at position 2) to attributes detected at an earlier time (aligned time) at position 1. Thus, data collection system 140 detects, based on the offset time, a correlation between the one or more attributes detected at the second position and a condition associated with the material at the first position. Thus, data collection system 140 may calculate an offset time between position 1 and position 2 at the time an event is detected by one or more sensors at the first position or the second position. For example, if at a specific time a product is manufactured with a quality control issue (e.g., fries are too short), the data collection system 140 may track back when the material for that product (e.g., various potato processing steps) moved through each position in the manufacturing process. The data collection system 140 may display the various conditions at various position in the process to determine whether there may be an issue with the process at one of the positions. Though examples are made in reference to "fries," the data collection system may be used for components of materials other than fries being made from potatoes. The data collection system 140 may alert a user as to the position(s) in the manufacturing process responsible for causing the quality control issue.

In an embodiment, data collection system 140 determines a defect using a machine learning model. For example, imaging sensors (e.g., camera, infrared, x-ray, or any other imaging sensor) may be equipped wherever sensors are described to be located herein. A machine learning model may be trained using training data that includes images of a given item being processed (e.g., potatoes to fries), as labeled with whether a manufacturing defect is present. In an embodiment, different machine learning models may be trained for different steps in the manufacturing process (e.g., a model to detect a defective potato is different from a model to detect chopped potatoes, which may be trained differently from a model to detect whether the chopped potatoes are burned or not). Alternatively, a single model may be used, where the training data additionally includes a label indicating the step in the process to which it corresponds. The imaging sensor may provide input to a trained model, which may output whether a manufacturing defect is present. For computational efficiency, in an embodiment, a model may be used at the end of the process to determine whether a defect is present, where, responsive to detecting a defect, data collection system 140 determines conditions relating to that particular product through its manufacturing process, comparing conditions at each step of the process to expected normal conditions at each step of the process, in order to determine a first instance where the expected normal conditions do not match the determined conditions. Data collection system 140 determines that this first instance introduced the manufacturing defect, and alerts a user as to step corresponding to the first instance (e.g., allowing the user to investigate hardware and/or software corresponding to that step to perform repairs). Various user interfaces through which an alert may be presented are discussed below with reference to FIGS. 8-11.

Data collection system 140 may repeat the offset for the second position and the same calculations to achieve alignment at another position (e.g., third position or "position 3"). That is, data collection system 140 may calculate an offset between position 2 and another position (e.g., position 3) and add the offset calculated between position 1 and position 2 to generate an offset between position 1 and another position (e.g., position 3).

Figure 3:
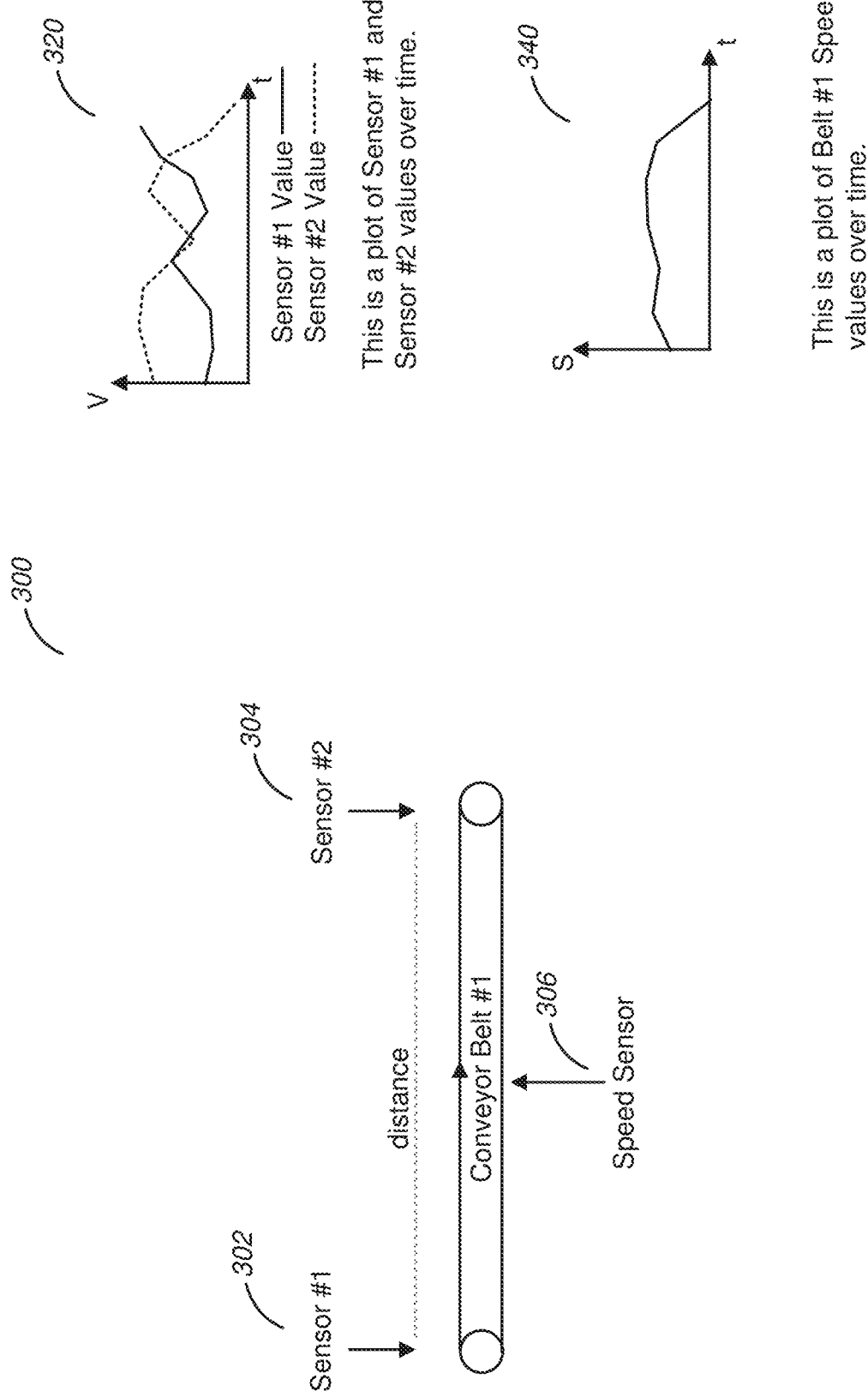
FIG. 3 illustrates an exemplary system and sensor operation.

FIG. 3 illustrates an exemplary system and sensor operation. A transportation mechanism 300 (conveyor belt) transports material between two positions. At the beginning of the conveyor belt, sensor 302 detects one or more attributes associated with the material while, at the end of the conveyor belt, sensor 304 detects one or more attributes associated with the material after the material has gone through the conveyor belt. The conveyor belt may also include a speed sensor 306 that measures the speed of the belt over time. While the material travels on the conveyor belt, it may be processed (e.g., heated, cooled, blended, compressed, ground, chopped, distilled, etc.). Plot 320 exemplifies a plot of values of sensor 302 and sensor 304 between time zero and time t. In addition, plot 340 exemplifies a plot of belt speed between time zero and time t. When the two graphs are aligned, the system may present (e.g., in a graphical user interface) the two graphs to indicate how data from sensor 302 and sensor 304 changes as speed of the belt changes as detected by speed sensor 306.

Figure 4:
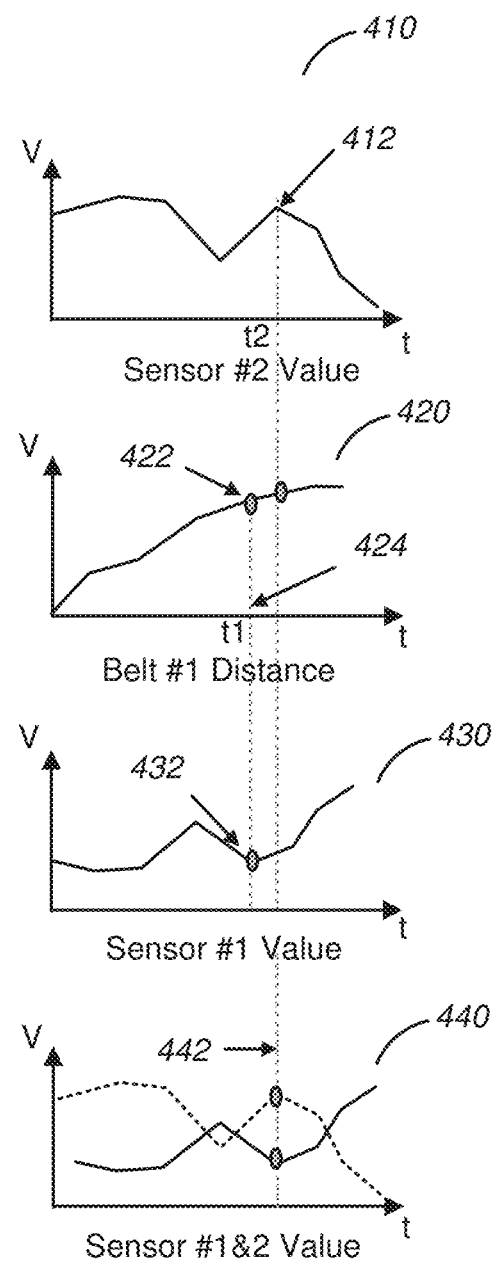
FIG. 4 illustrates how to correlate material at two different sensors over a particular time period

FIG. 4 illustrates how to correlate material at two different sensors over a particular time period. The term period does not necessarily imply periodicity, and instead may be a block of time between a start and end point. Graph 410 shows value 412 indicating a max value of material at sensor #2 (e.g., sensor 304) at time=t2. Graph 420 shows value 422 indicating position 1 of corresponding material, computed by taking the offset value of the length of the transportation mechanism 300 (e.g., conveyor belt). Value 424 indicates a time value t1 at the beginning of the transportation mechanism for the corresponding material. Value 432 of graph 430 indicates the value of the corresponding material at sensor 1 (e.g., sensor 302). The amount of time that material travels from sensor 1 to sensor 2 may be calculated by subtracting t1 from t2. By applying an offset of the travel time on sensor 1 value, the values for the same material in sensor 1 and 2 may now be correlated. Graph 440 shows data illustrates that correlation.

Figure 5:
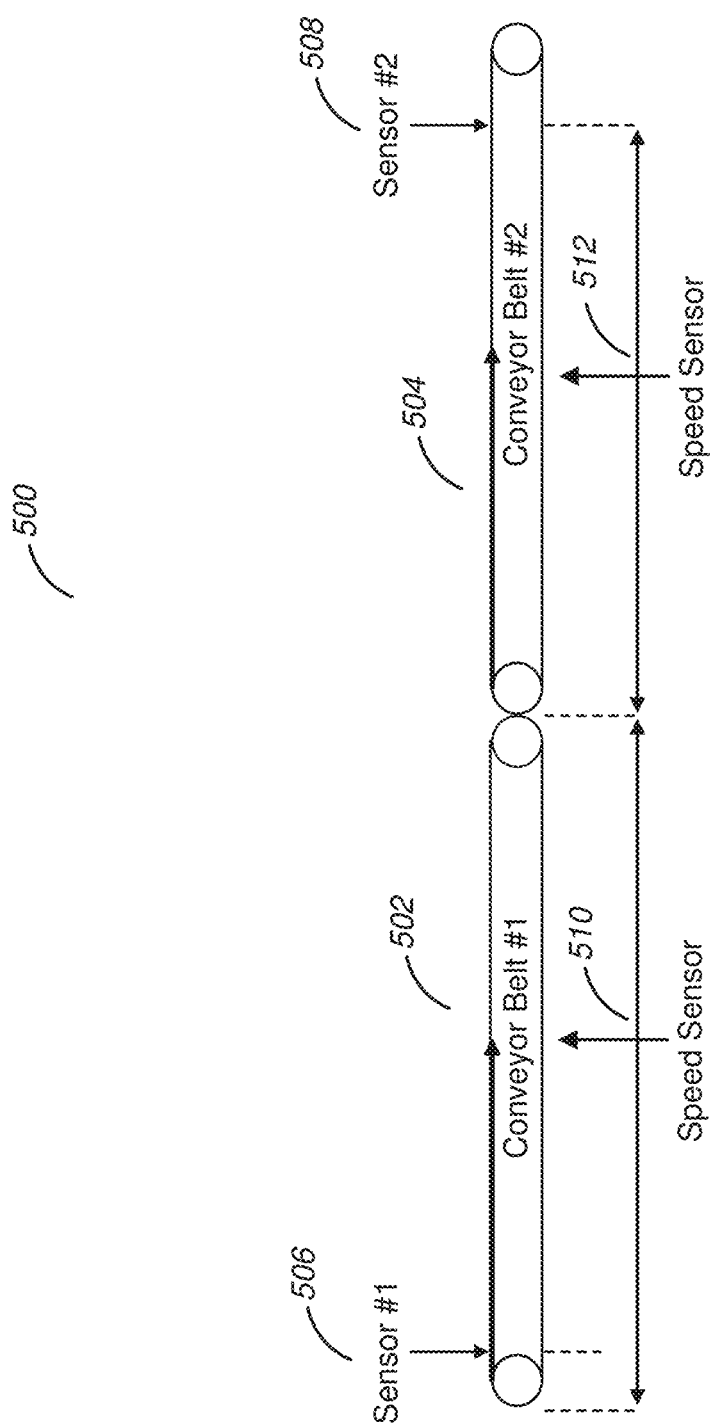
FIG. 5 illustrates another exemplary system and sensor operation.

FIG. 5 illustrates another exemplary system and sensor operation. System 500 includes conveyor belt 502 and conveyor belt 504. Sensor 506 may be positioned along a conveyor belt 502 while sensor 508 may be positioned along conveyor belt 504. Conveyor belt 502 may include a speed sensor 510 for measuring the speed of conveyor belt 502 while speed sensor 512 may measure speed of conveyor belt 504. Thus, the first position and the second position may be along different transportation mechanisms and data collection system 140 may determine the alignment values over different transportation mechanisms. When combining the transportation time for the two transportation mechanisms, the system 500 offsets the transportation time for each of the mechanisms. In particular, the system 500 calculates the transportation time from sensor 506 to sensor 508 for material present at the position of sensor 508 by first calculating the transportation time from the beginning of conveyor belt 504 to sensor 508. The system 500 then calculates the transportation time from the end of conveyor belt 502 to sensor 506 at the time that the material that was present at sensor 508 is present at the end of conveyor belt 502.

Computing Machine Architecture

Figure 6:
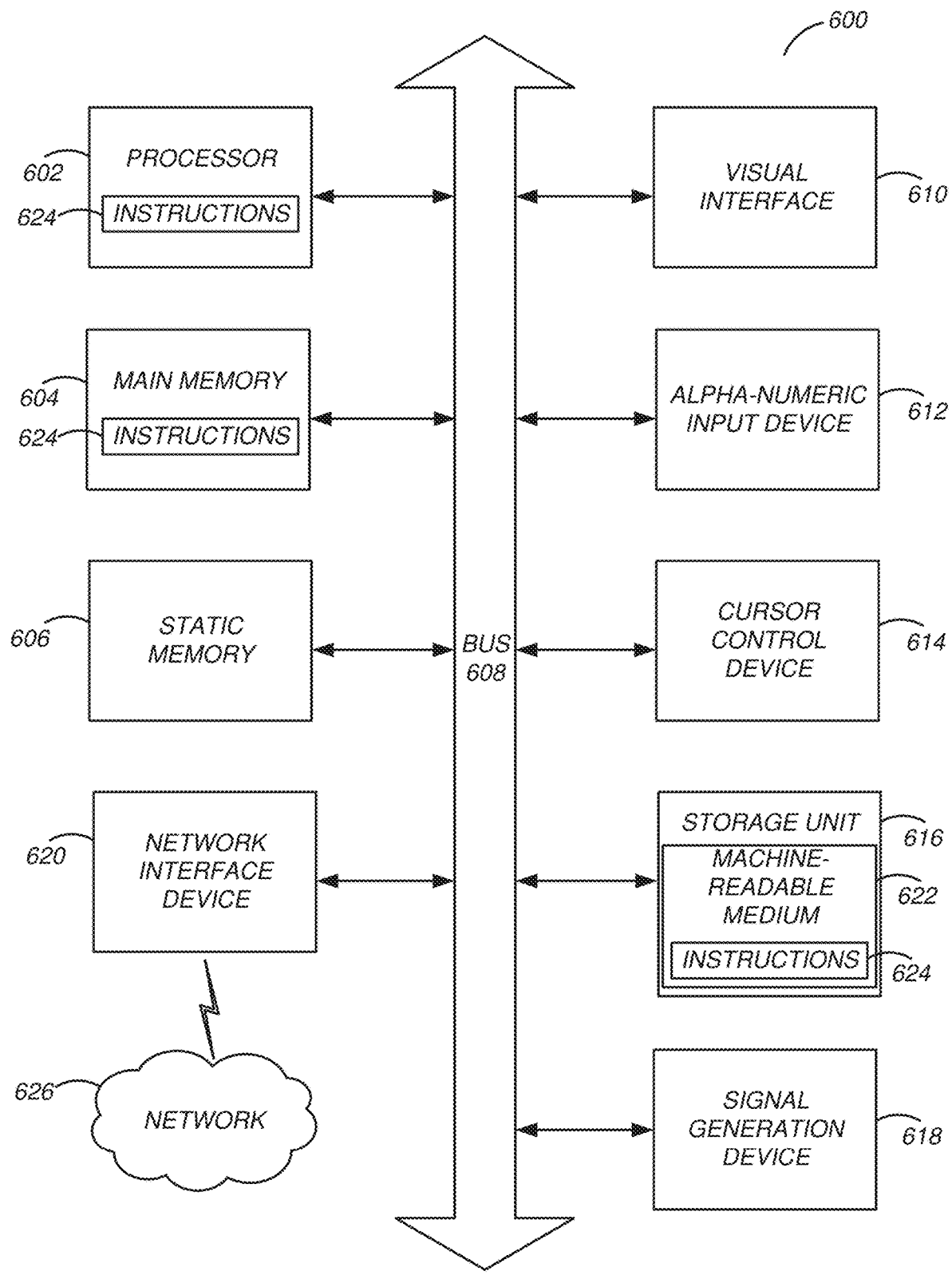
FIG. 6 is a block diagram illustrating components of an example machine (e.g., data collection system 140) able to read instructions from a machine-readable medium and execute them in a processor (or controller).

FIG. 6 is a block diagram illustrating components of an example machine (e.g., data collection system 140) able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system X00 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Using Computing Machine Architecture

FIG. 7 illustrates method 700 for aligning process data to a flow of material in a manufacturing process. At 702, the data alignment system 100 continually detects, using one or more sensors at a first position, one or more first attributes associated with the material. The data alignment system 100 may receive the attributes from the sensors at network interface device 620 via network 626. At 704, the data alignment system 100 continually detects, using one or more sensors at a second position, one or more second attributes associated with the material. The material is transported using a transportation mechanism from the first position to the second position. The data alignment system 100 may receive the attributes from the sensors at network interface device 620 via network 626.

At 706, the data alignment system 100 periodically (e.g., from time-to-time or at regular intervals) stores in a first record the one or more first attributes with a corresponding first time of detection and in a second record the one or more second attributes with a corresponding second time of detection. In some embodiment, periodically storing the records may mean that the data alignment system 100 stores the records periodically from time-to-time rather than at set intervals. The data alignment system 100 may store the attributes in main memory 604 and/or storage unit 616. At 708, the data alignment system 100 determines, using one or more speed sensors, a speed of the material as it is transported using the transportation mechanism. The speed of the material changes while the material is transported from the first position to the second position. For example, the data alignment system 100 may use speed sensors that transmit sensor data to a network interface device 620 over network 626.

At 710, the data alignment system 100 periodically stores the speed of the material with a corresponding time of detection. For example, the data alignment system 100 may store the speeds in main memory 604 and/or storage unit 616. At 712, the data alignment system 100 calculates, for each first record, an offset time when a portion of the material corresponding to the first attributes in the first record passes the second position based on stored speeds and a distance between the first position and the second position. For example, the data alignment system 100 may use process 602 to perform the calculation. At 714, the data alignment system 100, based on a corresponding offset time, aligns each first record with a corresponding second record. For example, the data alignment system may add an entry in main memory 604 and/or storage unit 616.

Exemplary User Interfaces

Figure 8:
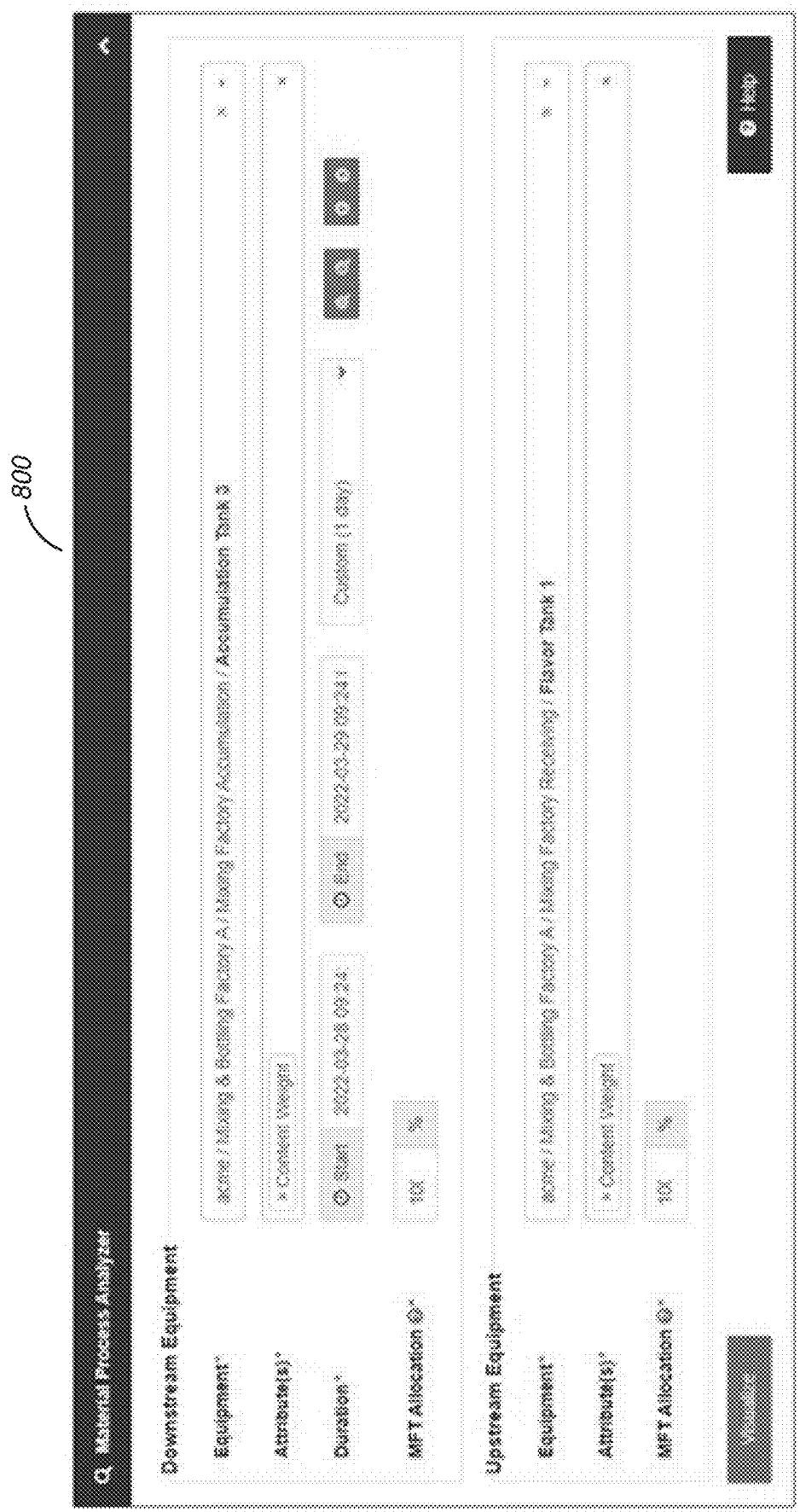
FIG. 8 illustrates a user interface for configuring an analysis of a material process, in accordance with one embodiment.

FIG. 8 illustrates a user interface for configuring an analysis of a material process, in accordance with one embodiment. User interface 800 enables a user to select parameters for analyzing a materials process. For example, equipment, such as an accumulation tank or a conveyor belt, may be selected. Attributes may be selected, such as items detected by sensors. For example, weight within an equipment, volume within an equipment, and so on may be selected. A duration may be specified for analysis. This information may be specified for both downstream and upstream equipment relative to a process. A selectable option may be present to visualize the inputs of the analyzer.

Figure 9:
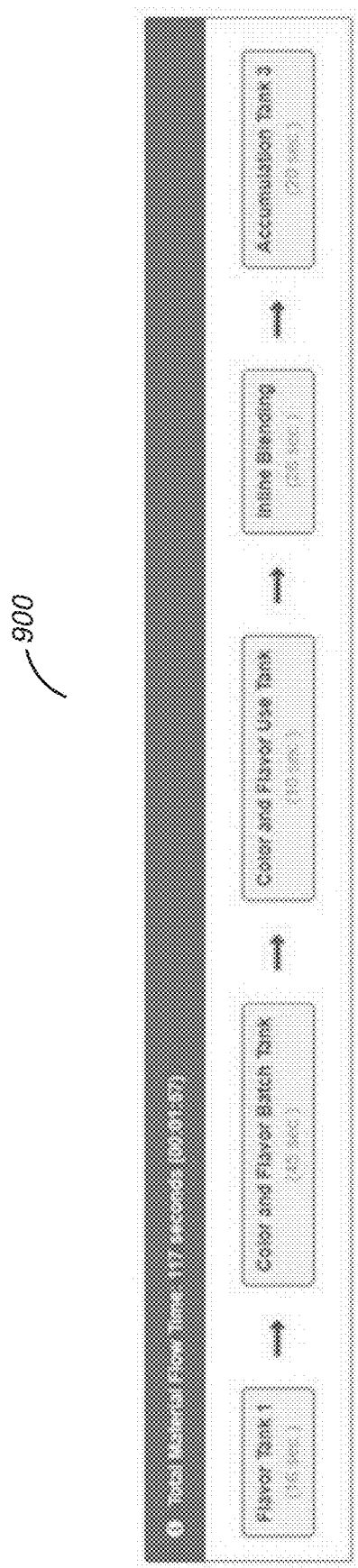
FIG. 9 illustrates a user interface for conveying stepwise progress through a material process, in accordance with one embodiment.

FIG. 9 illustrates a user interface for conveying stepwise progress through a material process, in accordance with one embodiment. In an embodiment, user interface 900 is presented to a user responsive to selection of a visualize option from user interface 800. User interface 900 may show a process flow of equipment, and an amount of time material spends in each equipment, during a manufacturing process. In an embodiment, where an abnormality is detected in a component, that component may be accentuated (e.g., colored) differently from other components. Abnormality and error detection is described in further detail in the foregoing.

Figure 10:
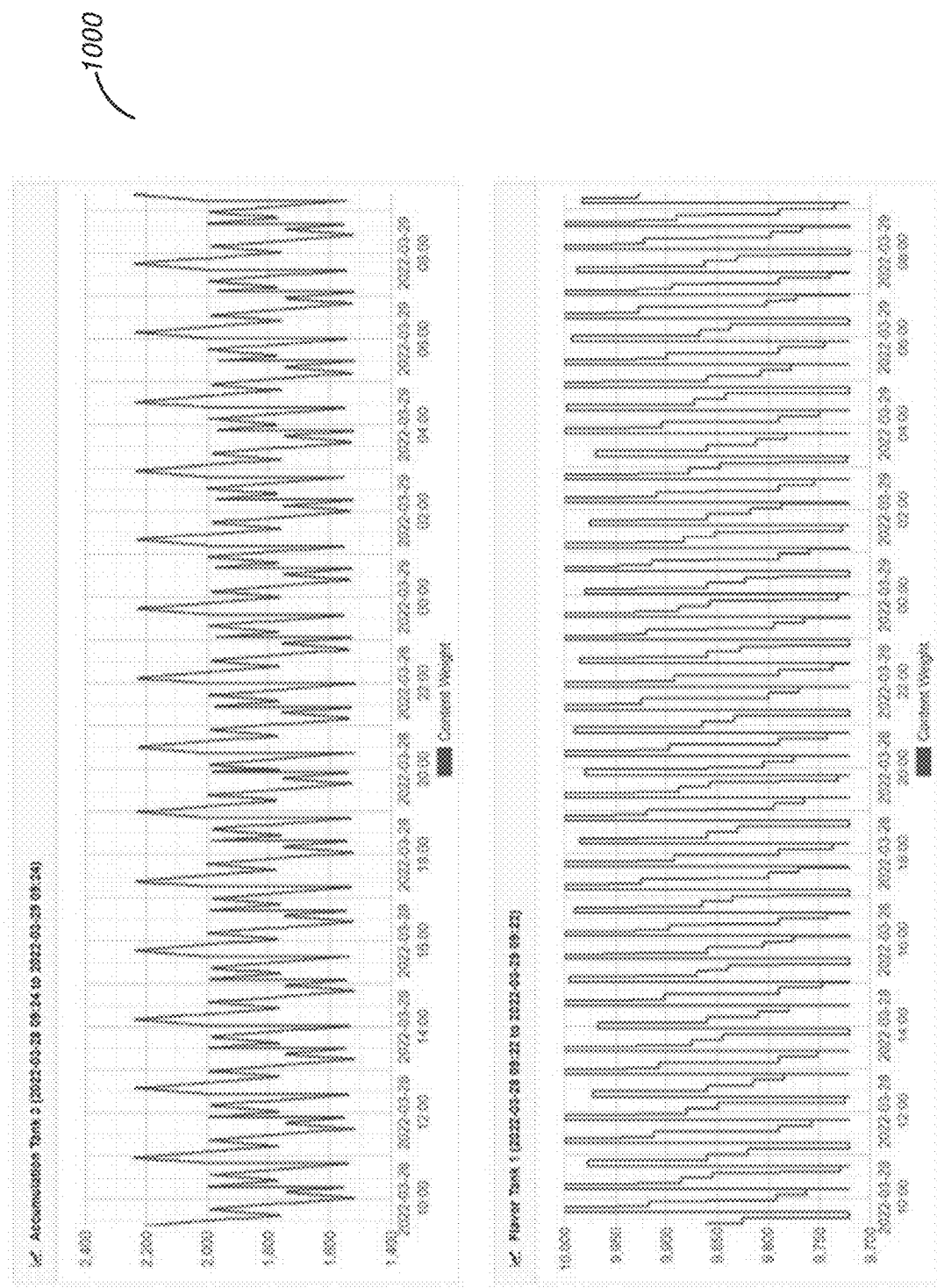
FIG. 10 illustrates a user interface for viewing a parameter corresponding to different components of a material process, in accordance with one embodiment.

FIG. 10 illustrates a user interface for viewing a parameter corresponding to different components of a material process, in accordance with one embodiment. User interface 1000 shows granular data over time relating to each component configured for analysis using user interface 800. For example, weight over time in given tanks of a manufacturing process is depicted in user interface 1000.

Figure 11:
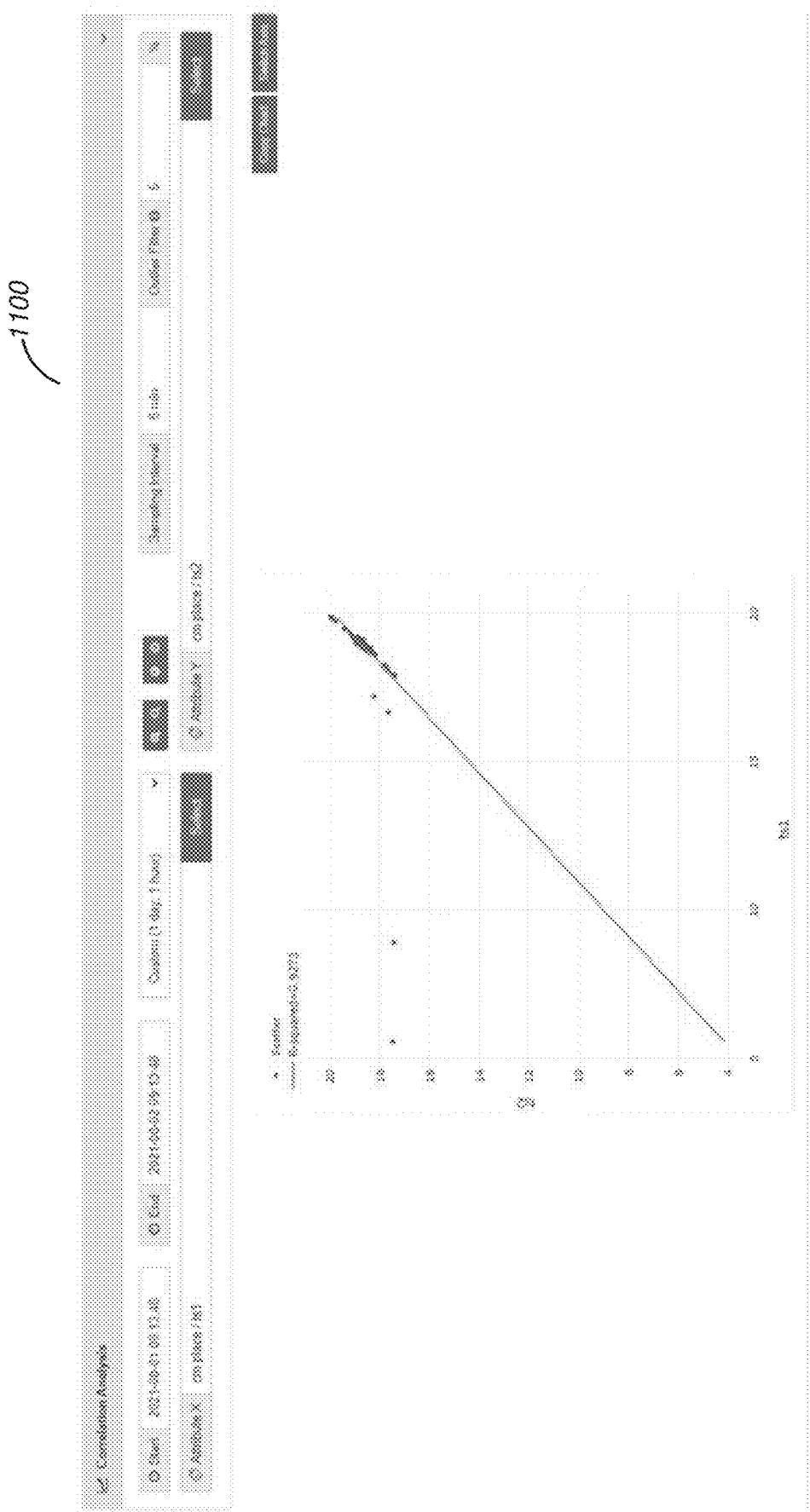
FIG. 11 illustrates a user interface for evaluating a parameter corresponding to of a material process, in accordance with one embodiment.

FIG. 11 illustrates a user interface for evaluating a parameter corresponding to of a material process, in accordance with one embodiment. As shown in user interface 1100, a correlation of data for a given attribute over time is shown. A high correlation indicates a likelihood that no error has occurred; outliers may indicate errors.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically, electronically, or virtually. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for aligning process data to a flow of material in a manufacturing process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for aligning process data to a flow of material in a manufacturing process, the method comprising:
continually detecting, using one or more sensors at a first position, one or more first attributes associated with the material;
continually detecting, using one or more sensors at a second position, one or more second attributes associated with the material, wherein the material is transported using a transportation mechanism from the first position to the second position;
periodically storing in a first record the one or more first attributes with a corresponding first time of detection and in a second record the one or more second attributes with a corresponding second time of detection;
determining, using one or more speed sensors, a speed of the material as it is transported using the transportation mechanism, wherein the speed of the material changes while the material is transported from the first position to the second position;
periodically storing the speed of the material with a corresponding time of detection;
based on stored speeds and a distance between the first position and the second position, calculating, for each first record, an offset time when a portion of the material corresponding to the first attributes in the first record passes the second position; and
based on a corresponding offset time, aligning each first record with a corresponding second record.

2. The method of claim 1, further comprising, based on each offset time, aligning each second record with a corresponding first record.

3. The method of claim 1, wherein record time is persisted in a timeseries data store.

4. The method of claim 1, wherein periodically storing in a first record the one or more first attributes with a corresponding first time of detection comprises storing the one or more first attributes when one or more values of the one or more first attributes change, and not when each value of the one or more first attributes does not change.

5. The method of claim 1, wherein the one or more first attributes and the one or more second attributes has quality information indicating a reliability value, and the method is using this quality information to determine when the transportation time can be calculated.

6. The method of claim 1, wherein calculating, for each first record, the offset time comprises calculating an integral of recorded speeds over time that it takes for a given portion of the material to travel between the first position and the second position.

7. The method of claim 1, further comprising detecting, based on the offset time, a correlation between the one or more attributes detected at the second position and a condition associated with the material at the first position.

8. The method of claim 1, further comprising calculating an offset time between the first position and a third position using a corresponding offset time between the first position and the second position.

9. The method of claim 1, further comprising calculating an offset time between the first position and second position at the time an event is detected by one or more sensors at the first position or the second position.

10. A non-transitory computer readable medium configured to store instructions, the instructions when executed by one or more processors cause the one or more processors to:
continually detect, using one or more sensors at a first position, one or more first attributes associated with the material;
continually detect, using one or more sensors at a second position, one or more second attributes associated with the material, wherein the material is transported using a transportation mechanism from the first position to the second position;
periodically store in a first record the one or more first attributes with a corresponding first time of detection and in a second record the one or more second attributes with a corresponding second time of detection;
determine, using one or more speed sensors, a speed of the material as it is transported using the transportation mechanism, wherein the speed of the material changes while the material is transported from the first position to the second position;
periodically store the speed of the material with a corresponding time of detection;
based on stored speeds and a distance between the first position and the second position, calculating, for each first record, an offset time when a portion of the material corresponding to the first attributes in the first record passes the second position; and
based on a corresponding offset time, align each first record with a corresponding second record.

11. The non-transitory computer-readable medium of claim 10, the instructions further causing the one or more processors to, based on each offset time, align each second record with a corresponding first record.

12. The non-transitory computer-readable medium of claim 10, wherein record time is persisted in a timeseries data store.

13. The non-transitory computer-readable medium of claim 10, wherein periodically storing in a first record the one or more first attributes with a corresponding first time of detection comprises storing the one or more first attributes when one or more values of the one or more first attributes change, and not when each value of the one or more first attributes does not change.

14. The non-transitory computer-readable medium of claim 10, wherein the one or more first attributes and the one or more second attributes has quality information indicating a reliability value, and the one or more processors are using this quality information to determine when the transportation time can be calculated.

15. The non-transitory computer-readable medium of claim 10, wherein calculating, for each first record, the offset time comprises calculating an integral of recorded speeds over time that it takes for a given portion of the material to travel between the first position and the second position.

16. The non-transitory computer-readable medium of claim 10, the instructions further causing the one or more processors to detect, based on the offset time, a correlation between the one or more attributes detected at the second position and a condition associated with the material at the first position.

17. The non-transitory computer-readable medium of claim 10, the instructions further causing the one or more processors to calculate an offset time between the first position and a third position using a corresponding offset time between the first position and the second position.

18. The non-transitory computer-readable medium of claim 10, the instructions further causing the one or more processors to calculate an offset time between the first position and second position at the time an event is detected by one or more sensors at the first position or the second position.

19. A system for aligning process data to a flow of material in a manufacturing process, the system comprising:
   memory with instructions encoded thereon; and
   one or more processors that, when executing the instructions, are caused to perform operations comprising:
      continually detecting, using one or more sensors at a first position, one or more first attributes associated with the material;
      continually detecting, using one or more sensors at a second position, one or more second attributes associated with the material, wherein the material is transported using a transportation mechanism from the first position to the second position;
      periodically storing in a first record the one or more first attributes with a corresponding first time of detection and in a second record the one or more second attributes with a corresponding second time of detection;
      determining, using one or more speed sensors, a speed of the material as it is transported using the transportation mechanism, wherein the speed of the material changes while the material is transported from the first position to the second position;
      periodically storing the speed of the material with a corresponding time of detection;
      based on stored speeds and a distance between the first position and the second position, calculating, for each first record, an offset time when a portion of the material corresponding to the first attributes in the first record passes the second position; and
      based on a corresponding offset time, aligning each first record with a corresponding second record.

20. The system of claim 19, the operations further comprising, based on each offset time, aligning each second record with a corresponding first record.

* * * * *